(12) United States Patent
Getman et al.

(10) Patent No.: US 6,352,000 B1
(45) Date of Patent: Mar. 5, 2002

(54) VORTEX FLOW SENSOR

(76) Inventors: Igor Getman, Goethestrasse 3, D-79540 Lörrach; Sergej Lopatin, Frieburger Strasse 321-A, D-79539 Lörrach; Tanja Stöcklin, Bergstrasse 3, D-79539 Lörrach; Frank Ohle, Am Weiher 11, D-79585 Steinen; Roger Kerrom, Hermann-Albrecht-Strasse 24, D-79540 Lörrach, all of (DE)

( * ) Notice: Subject to any disclaimer, the term of this patent is extended or adjusted under 35 U.S.C. 154(b) by 0 days.

(21) Appl. No.: 09/371,324

(22) Filed: Aug. 10, 1999

(30) Foreign Application Priority Data

Aug. 12, 1998 (EP) .............................. 98115162

(51) Int. Cl.[7] .................................. G01F 1/32
(52) U.S. Cl. .................................. 73/861.22
(58) Field of Search .................. 73/861.22, 861.24, 73/861.23, 194

(56) References Cited

U.S. PATENT DOCUMENTS

| | | | | |
|---|---|---|---|---|
| 3,948,098 A | * | 4/1976 | Richardson et al. | 73/194 |
| 4,248,098 A | | 2/1981 | Sawayama et al. | |
| 4,329,880 A | * | 5/1982 | Herzl | 73/861.24 |
| 4,440,027 A | * | 4/1984 | Focht | 73/861.24 |
| 4,706,503 A | * | 11/1987 | Kamentser | 73/861.24 |
| 4,791,818 A | * | 12/1988 | Wilde | 73/861.24 |
| 4,864,868 A | | 9/1989 | Khalifa | |
| 4,891,990 A | | 1/1990 | Khalifa | |
| 5,197,336 A | | 3/1993 | Tsuruoka et al. | |
| 6,003,384 A | * | 12/1999 | Frohlich et al. | 73/861.22 |

FOREIGN PATENT DOCUMENTS

| | | |
|---|---|---|
| EP | 0 841 545 | 10/1997 |
| JP | 58160813 | 9/1983 |

* cited by examiner

*Primary Examiner*—Benjamin R. Fuller
*Assistant Examiner*—Jewel V. Thompson
(74) *Attorney, Agent, or Firm*—Bose McKinney & Evans LLP

(57) ABSTRACT

The piezoelectric vortex sensing element (3, 3', 3", 3+) of this vortex flow sensor (1) can be assembled from individual components in a simple manner; if its piezoelectric element (**34, 34', 34", 34\*, 34+, 34++) should be faulty, it can be easily replaced. Also, the vortex sensing element can be made largely insensitive to vibrations acting from outside. The vortex flow sensor (1) serves to measure the flow velocity and/or the volumetric flow rate of a fluid flowing through a measuring tube (2). A bluff body (4) generating Kármán vortices is disposed along a diameter of the measuring tube and fixed to the measuring tube at at least one fixing point (41). The vortex sensing element responds to vortex-induced pressure fluctuations and either is installed in a wall (22) of the measuring tube down-stream of the bluff body in a tight manner or extends into a main bore (46) extending through the measuring tube into the bluff body. A diaphragm (33, 33", 33+) covers the main bore (46) or the wall bore (22). At the surface (331) of the diaphragm facing toward the fluid, a sensor vane (31, 31", 31+) or a sensor sleeve (31', 31\*) is fixed. The piezoelectric element is mechanically coupled to the surface (332**) of the diaphragm remote from the fluid.

13 Claims, 6 Drawing Sheets

VORTEX FLOW SENSOR

FIELD OF THE INVENTION

This invention relates to vortex flow sensors for measuring the flow velocity or the volumetric flow rate of a fluid flowing through a measuring tube, comprising a bluff body mounted along a diameter of the measuring tube and serving to generate Kármán vortices.

BACKGROUND OF THE INVENTION

During the operation of such a vortex flow sensor, a Kármán vortex street is formed downstream of the bluff body. Its pressure fluctuations are converted by a vortex sensing element into an electric signal whose frequency is proportional to the volumetric flow rate.

EP-A 841 545, corresponding to U.S. patent application Ser. No. 08/953,229, filed Oct. 17, 1997, discloses a vortex flow sensor for measuring the flow velocity and/or the volumetric flow rate of a fluid flowing through a measuring tube, comprising:
- a bluff body serving to generate Kármán vortices which is disposed along a diameter of the measuring tube and connected with the measuring tube at at least one fixing point; and
- a capacitive vortex sensing element responsive to vortex-induced pressure fluctuations which is inserted in a wall bore of the measuring tube downstream of the bluff body, sealing off the bore toward the external surface of the measuring tube, with the center of the bore and the center of the fixing point lying on a straight surface line of the measuring tube, and which comprises:
  - a diaphragm covering the bore and having a first surface facing toward the fluid and a second surface remote from the fluid;
  - a rigid, thin sensor vane which is attached to the first surface, is shorter than the diameter of the measuring tube, and has flat major surfaces which are in alignment with the straight surface line of the measuring tube; and
  - an electrode arrangement attached to the second surface.

EP-A 841 545 further discloses a vortex flow sensor for measuring the flow velocity and/or the volumetric flow rate of a fluid flowing through a measuring tube, comprising:
- a bluff body serving to generate Kármán vortices which is disposed along a diameter of the measuring tube, is connected with the measuring tube at at least one fixing point, and has a main bore, extending in the direction of said diameter and through the measuring tube, and at least one secondary bore, which connects the main bore with the fluid; and
- a capacitive vortex sensing element responsive to vortex-induced pressure fluctuations and inserted in the main bore, sealing of f the external surface of the measuring tube from the fluid, said capacitive vortex sensing element comprising:
  - a diaphragm covering the measuring-tube-side end of the main bore and having a first surface facing toward the fluid and a second surface remote from the fluid;
  - a rigid sensor vane attached to the first surface; and
  - an electrode arrangement attached to the second surface.

As the two vortex flow sensors disclosed in EP-A 841 545 show, the vortex sensing element can be disposed either in the bluff body or in the bore in the wall of the measuring tube. Although such vortex flow sensors have proved to be effective in practice, it is desirable to use piezoelectric sensing elements instead of capacitive sensing elements. The use of piezoelectric elements in vortex flow sensors is in the prior art.

U.S. Pat. No. 4,248,098, for example, discloses a vortex flow sensor for measuring the flow velocity and/or the volumetric flow rate of a fluid flowing through a measuring tube, comprising:
- a bluff body serving to generate Kármán vortices which is disposed along a diameter of the measuring tube and is permanently connected with the measuring tube at two fixing points; and
- a vortex sensing element in the form of at least one piezoelectric element responsive to vortex-induced mechanical stresses in the bluff body, said vortex sensing element being disposed
  - either in a recess of the bluff body provided in the area of one of the fixing points
  - or in a recess provided in a prolongation of the bluff body extending toward the outside of the measuring tube, with
  - either two individual piezoelectric elements being provided each having one electrode on two opposite surfaces
  - or a single piezoelectric element being provided having two electrically separated electrodes on a first surface and a common electrode on an opposite second surface.

Furthermore, JP-A 58-160 813 discloses a vortex flow sensor for measuring the flow velocity and/or the volumetric flow rate of a fluid flowing through a measuring tube, comprising:
- a bluff body serving to generate Kármán vortices which is disposed along a diameter of the measuring tube and is permanently connected with the measuring tube at only one fixing point; and
- a vortex sensing element responsive to vortex-induced mechanical stresses in the bluff body, said vortex sensing element being disposed
  - either in a recess of the bluff body provided in the area of the fixing point toward the outside of the measuring tube, with
  - either two individual piezoelectric elements being provided each having one electrode on two opposite surfaces
  - or a single piezoelectric element being provided having two electrically separated electrodes on a first surface and a common electrode on an opposite second surface.

EP-A 319 424 discloses a vortex flow sensor for measuring the flow velocity and/or the volumetric flow rate of a fluid flowing through a measuring tube, comprising:
- a bluff body serving to generate Kármán vortices which is disposed along a diameter of the measuring tube and is permanently connected with the measuring tube at two fixing points; and
- a vortex sensing element responsive to vortex-induced pressure fluctuations and consisting of two piezoelectric elements which
  - are disposed on a surface of a diaphragm of the bluff body remote from the fluid, said diaphragm being provided at one of the fixing points.

Finally, U.S. Pat. No. 5,197,336 discloses a vortex flow sensor for measuring the flow velocity and/or the volumetric flow rate of a fluid flowing through a measuring tube, comprising:

a bluff body serving to generate Kármán vortices which is
disposed along a diameter of the measuring tube and is
permanently connected with the measuring tube at two
fixing points; and a vortex sensing element responsive to vortex-induced
pressure fluctuations which
extends downstream of and near and parallel to the
bluff body and is permanently connected with the
measuring tube at two opposite fixing points, and
is provided on a cylindrical prolongation extending
toward the outside of the measuring tube, said cylindrical prolongation supporting a concentric piezoelectric element.

SUMMARY OF THE INVENTION

It is an object of the invention to modify the prior-art designs of vortex flow sensors with piezoelectric elements in such a way that the vortex sensing element can be assembled from individual components in a simple manner, so that a faulty piezoelectric element can be easily replaced. Furthermore, it is to be possible to make the vortex sensing element largely insensitive to external vibrations.

To attain these objects, a first variant of the invention provides a vortex flow sensor for measuring the flow velocity and/or the volumetric flow rate of a fluid flowing through a measuring tube, comprising:

a bluff body serving to generate Kármán vortices which is
disposed along a diameter of the measuring tube and is
connected with the measuring tube at at least one fixing
point; and a vortex sensing element responsive to vortex-induced
pressure fluctuations and inserted in a wall bore of the
measuring tube downstream of the bluff body, sealing
off the bore toward the external surface of the measuring tube, with the center of the bore and the center of
the fixing point lying on a straight surface line of the
measuring tube, said vortex sensing element having the
following features:
a diaphragm covering the bore and having a first
surface facing toward the fluid and a second surface
remote from the fluid;
a rigid, thin sensor vane which is attached to the first
surface of the diaphragm, is shorter than the diameter
at the measuring tube, and has flat major surfaces
which are in alignment with the straight surface line
of the measuring tube; and
a piezoelectric element mechanically coupled to the
second surface of the diaphragm.

To attain the above objects, a second variant of the invention provides a vortex flow sensor for measuring the flow velocity and/or the volumetric flow rate of a fluidf lowing through a measuring tube, comprising:

a bluff body serving to generate Kármán vortices which is
disposed along a diameter of the measuring tube, is
connected with the measuring tube at at least one fixing
point, and has a main bore extending in the direction of
said diameter and through the measuring tube as well as
a secondary bore connecting the main bore with the
fluid; and a vortex sensing element responsive to vortex-induced
pressure fluctuations which is inserted in the main bore,
sealing off the external surface of the measuring tube
from the fluid, and has the following features:
a diaphragm covering the measuring-tube-side end of
the main bore and having a first surface facing
toward the fluid and a second surface remote from
the fluid;
a rigid sensor sleeve attached to the first surface of the
diaphragm; and
a piezoelectric element mechanically coupled to the
second surface of the diaphragm.

In a first preferred embodiment of the first or second variant of the invention, the piezoelectric element
is attached to the second surface of the diaphragm,
has a base electrode on a surface facing toward the
diaphragm, and
has a first electrode and a second electrode on a surface
remote from the diaphragm which are symmetrical with
respect to a median plane of the sensor vane.

In a second preferred embodiment of the first or second variant of the invention,
a first end of a flexible beam is fixed at the center of the
second surface of the diaphragm, and a second end of
the flexible beam is fixed to a holder rigidly connected
with the wall of the measuring tube;
a first piezoelectric element is bonded lengthwise to a first
surface of the flexible beam; and
a second piezoelectric element is bonded lengthwise to a
surface of the flexible beam opposite the first surface.

In a third preferred embodiment of the first or second variant of the invention,
a first end of a flexible beam is fixed at the center of the
second surface of the diaphragm, and a second end of
the flexible beam is fixed to a holder rigidly connected
with the wall of the measuring tube;
a first piezoelectric element is mechanically fixed lengthwise to a first surface of the flexible beam; and
a second piezoelectric element is mechanically fixed
lengthwise to a surface of the flexible beam opposite
the first surface.

According to a first preferred development of the first embodiment of the invention,
the diaphragm comprises a retaining ring,
to one end of which the diaphragm is fixed, and
which is thicker than the diaphragm;
an intermediate ring with an inside diameter, supported on
the retaining ring and screwed to the measuring tube,
forces the diaphragm against the external surface of the
measuring tube, with a sealing ring interposed between
the diaphragm and the measuring tube;
on the surface of the piezoelectric element remote from
the diaphragm, a contact-making body having a first
surface facing toward the piezoelectric element and a
second surface remote from the piezoelectric element is
provided which
is made of insulating material, has, on the surface
facing toward the piezoelectric element, a first contact area contacting the first electrode and a second
contact area contacting the second electrode, and
has, on the surface remote from the piezoelectric
element, a third contact area electrically connected to
the first contact area and a fourth contact area
electrically connected to the second contact area;
a thrust ring having a diameter slightly smaller than the
inside diameter of the intermediate ring is provided on
the contact-making body; and
a clamping plate supported on the thrust ring and screwed
to the intermediate ring forces the thrust ring against
the contact-making body, the contact-making body
against the piezoelectric element, and the piezoelectric
element against the diaphragm.

According to a second preferred development of the first embodiment of the invention, the piezoelectric element and the contact-making body are annular, each having a central hole; and on the surface of the diaphragm remote from the fluid, a compensating body extending into the central holes is provided, with the areal moment of inertia of the sensor vane at the surface of the diaphragm facing toward the fluid being approximately equal to the areal moment of inertia of the compensating body at the surface of the diaphragm remote from the fluid.

According to a third preferred development of the first embodiment of the invention, the piezoelectric element and the contact-making body are annular, each having a central hole; and on the surface of the diaphragm remote from the fluid, a compensating body extending into the central holes is provided, with the areal moment of inertia of the sensor sleeve at the surface of the diaphragm facing toward the fluid being approximately equal to the areal moment of inertia of the compensating body at the surface of the diaphragm remote from the fluid.

One advantage of the invention is that the vortex sensing element of the vortex flow sensor is assembled from individual components in a simple manner, so that a faulty piezoelectric element can be easily replaced. Furthermore, the vortex sensing element can be made largely insensitive to vibrations acting from outside.

BRIEF DESCRIPTION OF THE DRAWINGS

The invention and further advantages will become more apparent from the following description of embodiments when taken in conjunction with the accompanying drawings, which are not drawn to scale. Like parts are designated by like reference characters throughout the figures of the drawings. For the sake of clarity, however, reference characters already used have been omitted in subsequent figures. Also, details already described are not repeated in the description of subsequent figures.

In the drawings.

DETAILED DESCRIPTION OF PREFERRED EMBODIMENTS

Figure 1:
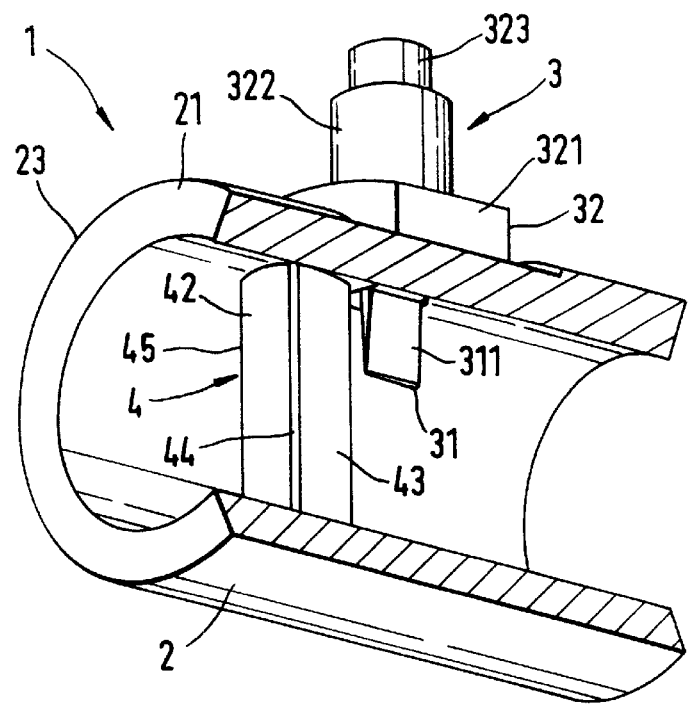
FIG. 1 is a perspective, partially sectioned view, in the direction of fluid flow, of a vortex flow sensor with a vortex sensing element fixed in the wall of the measuring tube in accordance with the first variant of the invention.
Figure 2:
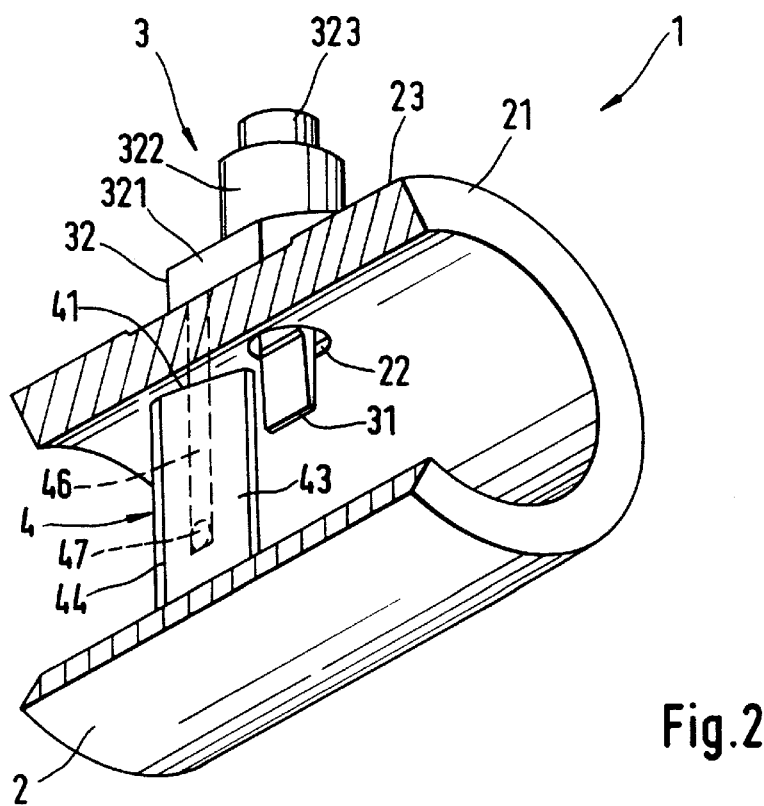
FIG. 2 is a perspective, partially sectioned view of the vortex flow sensor of FIG. 1 in the direction opposite flow.

The perspective, general views of FIGS. 1 and 2 show a cutaway vortex flow sensor 1 with a piezoelectric vortex sensing element 3 fixed in and to a wall 21 of a measuring tube 2, as seen in the direction of flow and in the direction opposite flow, respectively.

In FIGS. 1 and 2, a rigid, thin sensor vane 31, extending through a bore 22 in the wall 21 into the interior of the measuring tube 3 and having two flat major surfaces, and a housing cap 32 is all that can be seen of the vortex sensing element 3; of the two major surfaces, only the major surface 311 is visible in FIG. 1.

The housing cap 32 comprises a first portion 321, which is of rectangular section and is fixed, e.g. screwed, to an external surface 23 of the measuring tube 3. This is not shown in FIGS. 1 to 6 in order to simplify the illustration. For the fixing of the housing cap 32 and for the reception of the vortex sensing element 3, the external surface 23 may be machined to form a flat surface 24 as is assumed in FIGS. 3, 4, and 7 to 12.

Figure 3:
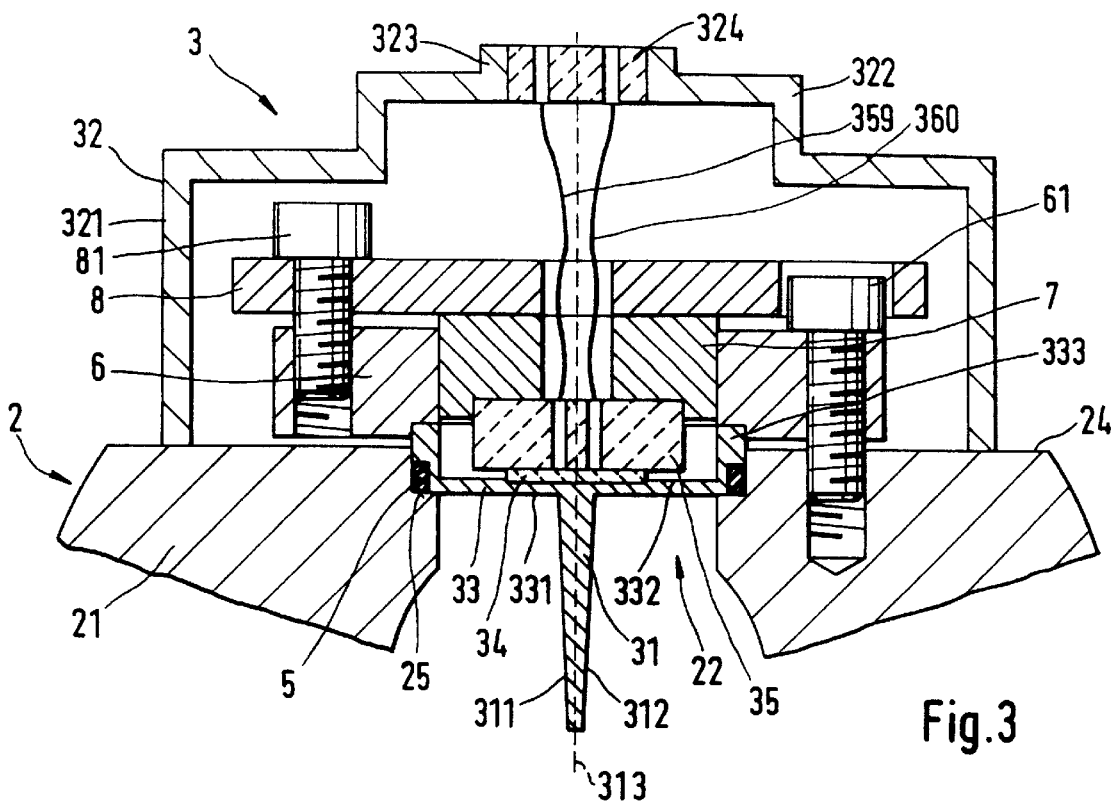
FIG. 3 is a vertical section of a first embodiment of a vortex sensing element fixed in the wall of the measuring tube in accordance with the first variant of the invention.

The portion 321 of the housing cap 32 merges into a cylindrical second portion 322, and the latter merges into a third portion 323, which receives a connector 324 (see FIG. 3). This construction and shape of the housing cap 32 is not mandatory; any other suitable shape may be chosen.

Disposed in the interior of the measuring tube 2 along a diameter thereof is a bluff body 4 which is permanently connected with the measuring tube 2, forming a first fixing point 41 and a second fixing point, which is not visible in FIGS. 1 and 2. It is also possible to dispense with one of the fixing points. The center of the bore 22 and the center of the fixing point 41 lie on a straight surface line of the measuring tube.

The bluff body 4 has a head surface 42, against which a fluid to be measured, e.g. a liquid, a gas, or a vapor, flows in operation, and two side surfaces, of which only one, the front surface 43, can be seen in FIGS. 1 and 2. The head surface 42 and the side surfaces form two separation edges, of which only one, the front separation edge 44, is completely visible in FIG. 1, while the other, the rear separation edge 45, is merely indicated. The separation edges 44, 45 are generally rounded in order to achieve good vortex shedding.

In FIG. 2 it is indicated by broken lines that, according to the second variant of the invention, instead of providing the sensor vane 31 of FIG. 1, a main bore 46 may be formed in the bluff body 4 parallel to the separation edges 44, 45, this bore also extending through the wall of the measuring tube 2. Preferably at the lower end of the main bore 46, a secondary bore 47 is provided which connects the main bore 46 with the fluid. A sensor sleeve 31' extends into the main bore 46, see FIGS. 4, 8, 10, and 12.

As the fluid flows against the head surface 42, a Kármán vortex street is formed downstream of the bluff body 4 due to the fact that vortices are shed alternately at the separation edges 44, 45 and are carried along by the moving fluid.

These vortices generate local pressure fluctuations in the fluid, which are converted by the vortex sensing element 3 into electric signals. The vortex shedding frequency is a measure of the volumetric flow rate and/or the flow velocity of the fluid.

The shape and cross section of the bluff body 4 of FIGS. 1 and 2 are essentially those of a right triangular prism, i.e., a prism of triangular section. However, other conventional shapes of the bluff body can also be used in the invention.

Three embodiments of the piezoelectric vortex sensing element 3 of FIGS. 1 and 2 for the first variant of the invention are shown in vertical sections in FIGS. 3, 7, 9, and 11.

Three embodiments for the second variant of the invention are shown in vertical sections in FIGS. 4, 8, 10, and 12. In FIGS. 3, 4, and 7 to 12, the housing cap 32 of FIGS. 1 and 2 has been omitted.

In FIGS. 3, 7, 9, 11, the piezoelectric vortex sensing element 3 comprises a diaphragm 33, 33", $33^+$ covering the bore 22 in the wall 21 of the measuring tube 2. In FIGS. 4, 8, 10, 12, the piezoelectric vortex sensing element 3' comprises a diaphragm 33', 33*, $33^{++}$ covering the main bore in the bluff body 4.

These diaphragms have a first surface 331 facing toward the fluid and a second surface 332 remote from the fluid, cf. FIG. 3. The respective diaphragm is fixed to one end of a retaining ring 333, which is higher than the diaphragm; preferably, the diaphragm and the retaining ring are of one-piece construction, as shown.

The respective diaphragm is made of a suitable metal, such as high-grade steel, and closes the bore 22 or the main bore 46 in a fluid-tight manner, so that even at a maximum permissible fluid pressure, no fluid can leak to the external surface 23 of the measuring tube 2. This is accomplished, for example, by interposing a sealing ring 5 between a flat supporting surface 25, formed in the wall 21 from outside, for example by milling, and the retaining ring 333.

The sensor vane 31, which is shorter than the diameter of the measuring tube 2, is fixed to the first surface 331 of the diaphragm 33. The flat major surfaces 311, 312 are in alignment with a straight surface line of the measuring tube 2 and may form a small wedge, as can be seen in FIGS. 1 to 3, 7, 9, and 11.

Figure 5:
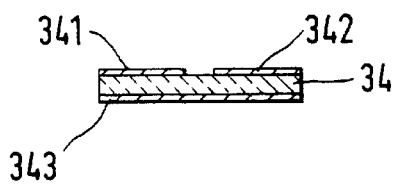
FIG. 5 is a vertical section of a piezoelectric element as shown in FIGS. 3 and 4.

Attached to the second surface 332 of the diaphragm 33 is a piezoelectric element 34, which is shown in FIG. 5 in a vertical section. A surface of the piezoelectric element 34 facing toward the diaphragm is provided with a base electrode 343, and a surface remote from the diaphragm is provided with a first electrode 341 and a second electrode 342, which are symmetrical with respect to a median plane of the sensor vane 31. This median plane is indicated in FIG. 3 as a broken line and is perpendicular to the plane of the paper.

Figure 6A:
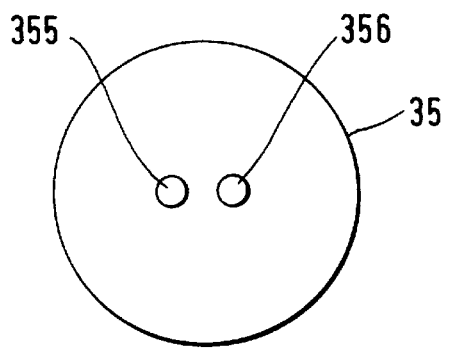
FIGS. 6a to 6c are a top view, a vertical section, and a bottom view, respectively, of a contact-makingbody as shown in FIGS. 3 and 4.
Figure 6B:
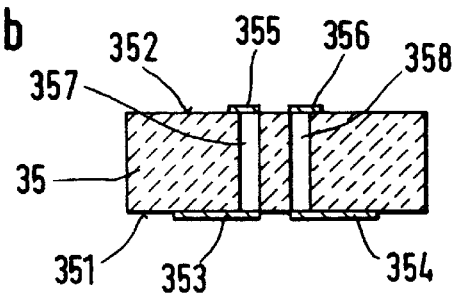
Figure 6C:
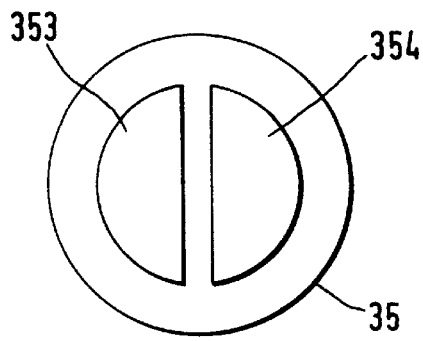

In FIG. 3, a contact-making body 34 with a first surface 351 facing toward the piezoelectric element 34 and a second surface 352 remote from the piezoelectric element is disposed on a surface of the piezoelectric element remote from the diaphragm, cf. FIGS. 6a to 6c, which show further details.

The contact-making body 35 is made of a suitable insulating material, such as ceramic, and has on the first surface 351 a first contact area 353, which contacts the first electrode 341 of the piezoelectric element 34, and a second contact area 354, which contacts the second electrode 342. Very good contact is made if the electrodes 341 and 342 are equal in area to the contact areas 352 and 354, respectively, and completely cover the latter in the assembled condition.

On the second surface 352, the contact-making body 35 has a third contact area 355 and a fourth contact area 356 (see FIGS. 6a to 6c), which are electrically connected to the first contact area 353 and the second contact area 354, respectively.

In FIG. 6b it can be seen that this is accomplished by means of conductors 357 and 358, respectively, passing through the contact-making body 35 from the first surface 351 to the second surface 352. These conductors may also project beyond the surface 352, so that leads can be attached, e.g., soldered, to their projecting ends.

This type of through-connection using conductors is not mandatory; it is also possible, for example, to provide a conductive track extending around the edge of the contact-making body 35 in a respective groove.

In FIG. 3, an intermediate ring 6 supported on the retaining ring 333 of the diaphragm 33 forces the diaphragm against the measuring tube 2, the intermediate ring 6 being screwed to the measuring tube. Of several screws used for this purpose, one screw 61 can be seen in FIG. 3. The intermediate ring 6 has an inside diameter approximately equal to the free diameter of the diaphragm 33.

Disposed on the contact-making body 35 is a thrust ring 7 with a diameter approximately equal to the free diameter of the diaphragm 33, and thus equal to the inside diameter of the intermediate ring.

The thrust ring 7 supports a clamping plate 8, which is screwed to the intermediate ring 6. Of several screws used for this purpose, one screw 81 can be seen in FIG. 3. The clamping plate 8 forces the thrust ring 7 against the contact-making body 35, the latter against the piezoelectric element 34, and the latter against the diaphragm 33.

Thus, in the assembled condition of the vortex sensing element 3, a constant mechanical force acts on the piezoelectric element 34, this constant force determining the measurement zero. The electrical bias produced by this mechanical load is reduced by the fact that the piezo-electric element is connected at the input end to a differential amplifier included in evaluation electronics, which are not shown and do not form part of the invention. Via the finite input resistance of the differential amplifier, the bias is reduced and made zero, so that it does not enter into the measurements.

Therefore, the vortex-induced pressure fluctuations can be measured without this measurement being affected by the process pressure and/or by thermally induced mechanical stresses. "Process pressure" as used herein means the pressure in the fluid, which is substantially constant.

In FIG. 3, two leads 359 and 360 can be seen which connect the third and fourth contact areas 355 and 356, respectively, of the contact-making body 35 to the connector 324. The latter is fitted in the third portion 323 of the housing cap 32 in a tight manner and serves to feed the measurement signals provided by the piezoelectric element 34 to the aforementioned evaluation electronics.

In operation, the above-explained pressure fluctuations cause deflections of the sensor vane 31 in a direction perpendicular to its major surfaces 311, 312. These deflections are transmitted by the diaphragm 33 to the piezoelectric element 34.

Figure 4:
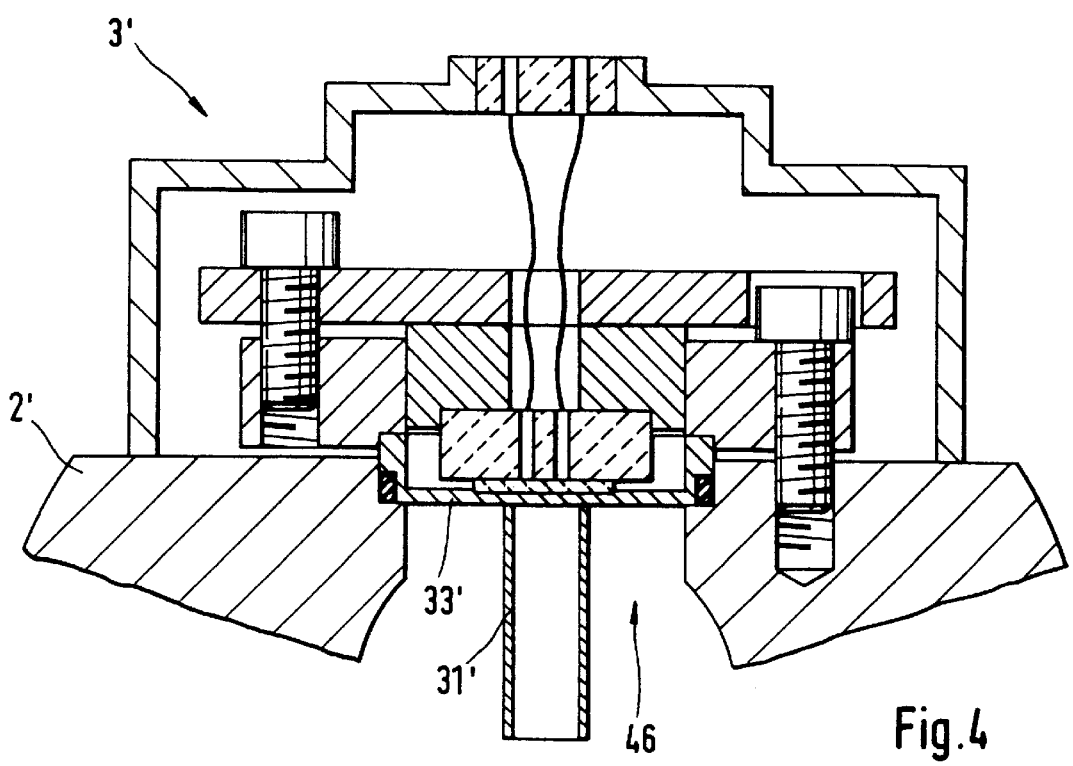
FIG. 4 is a vertical section of a first embodiment of a vortex sensing element extending into the main bore of the bluff body in accordance with the second variant of the invention.

FIG. 4 shows a vertical section of a first embodiment of a vortex sensing element 3' in accordance with the second variant of the invention. It differs from FIG. 3 only in that instead of the sensor vane 31 of FIG. 3, a rigid sensor sleeve 31' is attached to the first surface of the diaphragm 33'.

The sensor sleeve 31' is inserted in the above-mentioned main bore 46 of the bluff body 4 if the vortex sensing element is not located downstream of the bluff body as in FIGS. 1 to 3. In the main bore 46, the vortex sensing element 3' is moved by the vortex-induced pressure fluctuations and deflects the diaphragm 33'.

Figure 7:
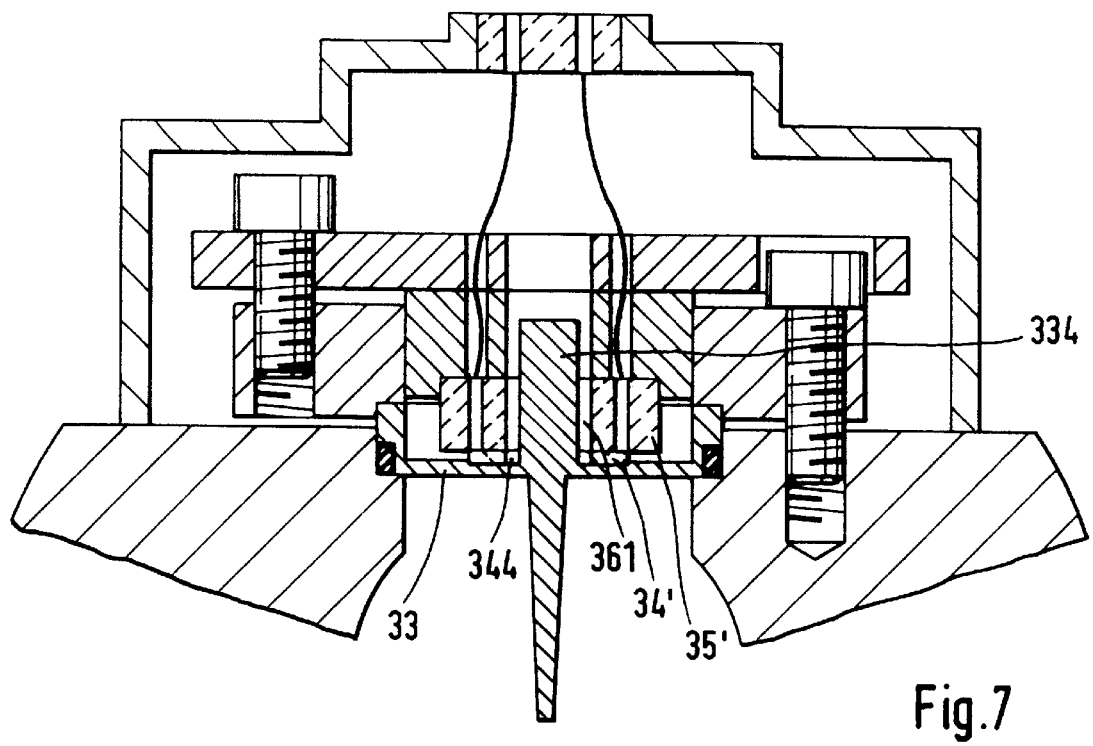
FIG. 7 is a vertical section of a development of the vortex sensing element of FIG. 3.
Figure 8:
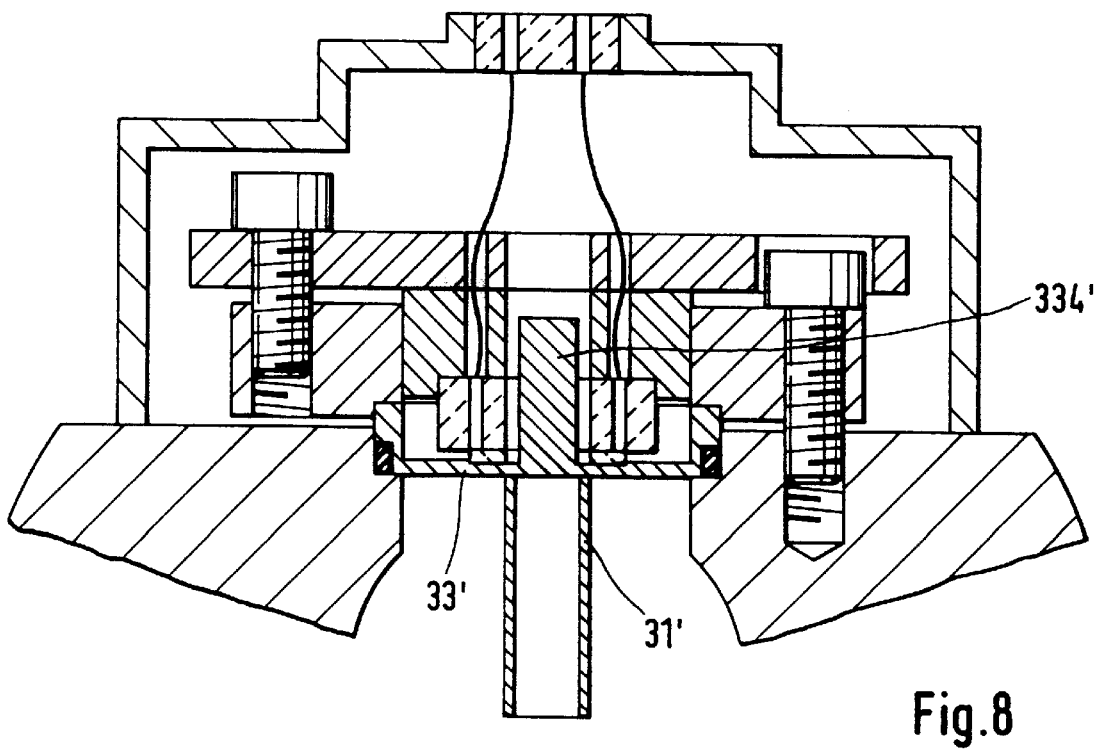
FIG. 8 is a vertical section of a development of the vortex sensing element of FIG. 4.

FIGS. 7 and 8 show vertical sections of developments of the vortex sensing elements of FIGS. 3 and 4, respectively. A piezoelectric element 34' and a contact-making body 35' corresponding to the piezoelectric element 34 and the contact-making body 35 of FIGS. 3 to 6 are annular in shape and have central holes 344 and 361, respectively.

On the surface of the diaphragm 33' remote from the fluid, a compensating body 334 (in FIG. 7) or 334' (in FIG. 8) is provided which extends into the central holes 344, 361; preferably, the diaphragm, the retaining ring, and the compensating body are made as one piece, as shown. The areal moment of inertia of the sensor vane 31 or the sensor sleeve 31' at the surface of the diaphragm 33 or 33' facing toward the fluid is made approximately equal to the areal moment of inertia of the compensating body 334 or 334' at the surface of the diaphragm 33 or 33' remote from the fluid.

Through this dimensioning choice, the mass of the compensating body 334 or 334' is approximately equal to that of the sensor vane 31 (FIG. 7) or the sensor sleeve 31' (FIG. 8), respectively, i.e., slightly less than, exactly equal to, or slightly greater than this mass.

By means of the compensating body 334, 334', disturbing effects that accelerations acting on the measuring tube 2 from outside, for example in the form of impacts or vibrations, may have on the piezoelectric element 34, 34' can be largely compensated for.

The above-mentioned choice of the areal moments of inertia, and thus of the masses, results in the following behavior in the presence of vibrations acting from outside. Let us assume that in FIG. 7 the sensor vane and the compensating body 334 are accelerated to the right in the plane of the paper. Because of the larger mass of the sensor vane, the force acting on the latter is greater than the force acting on the compensating body 334.

The diaphragm 33 transmits this greater force to the compensating body 334 in the opposite direction; the resulting force acting on the compensating body 334 is thus directed to the left, so that the compensating body will move to the left; thus, only a small deflection of the diaphragm 33 will result despite the vibration.

Figure 9:
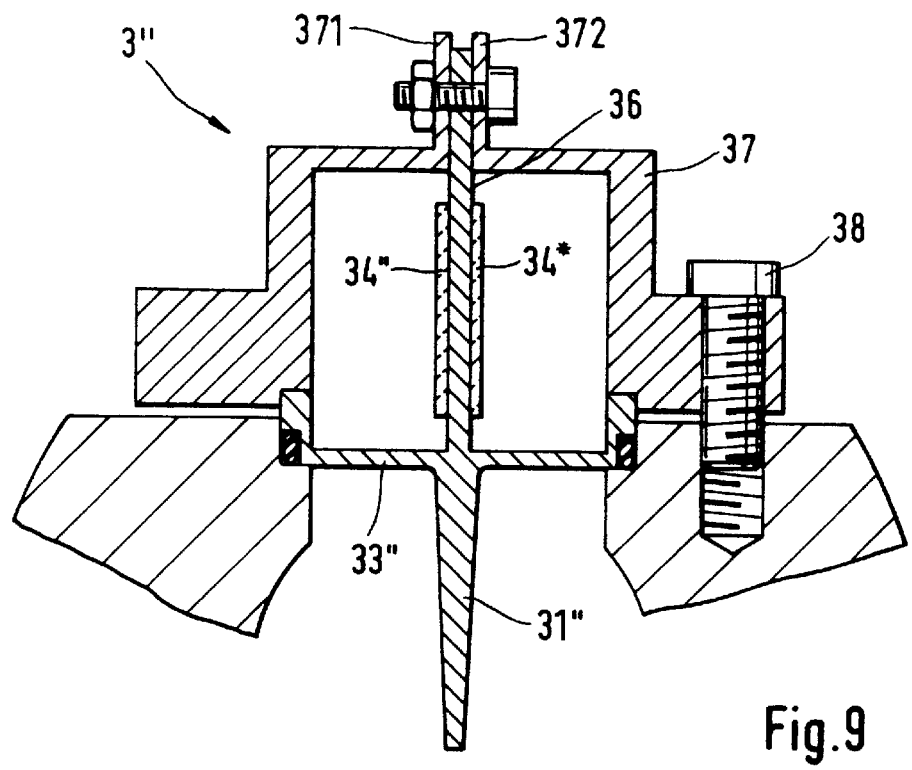
FIG. 9 is a schematic vertical section of a second embodiment of a vortex sensing element in accordance with the first variant of the invention.
Figure 10:
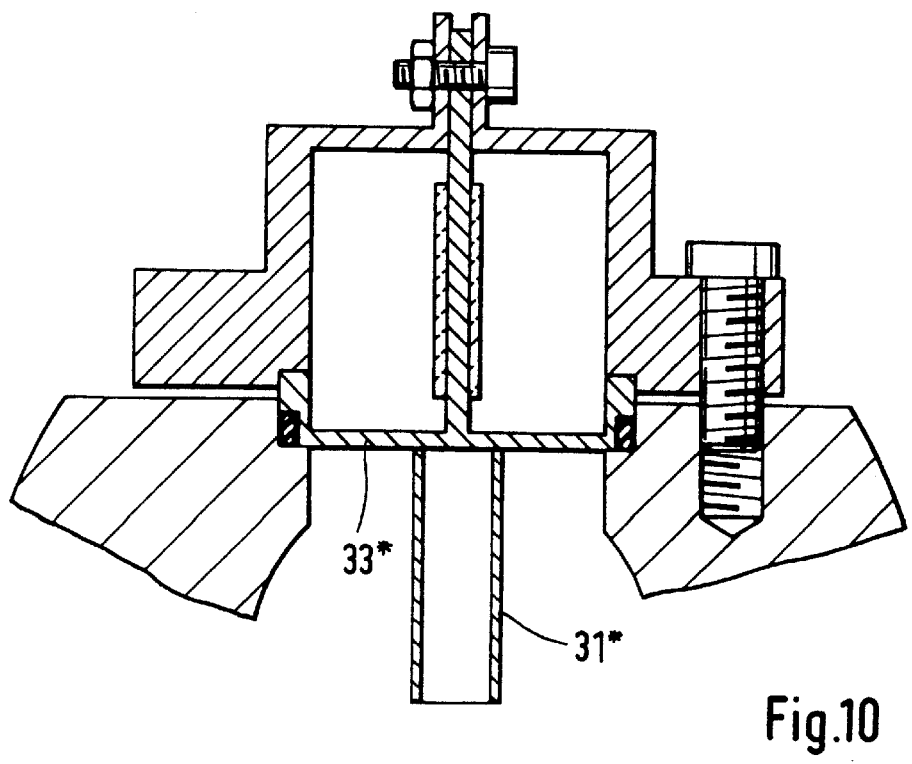
FIG. 10 is a schematic vertical section of a second embodiment of a vortex sensing element in accordance with the second variant of the invention.

FIGS. 9 and 10 show schematic vertical sections of a second embodiment of the vortex sensing element 3' according to the first and second variants of the invention, respectively. A first end of a flexible beam 36 is fixed at the center of the second surface of the diaphragm 33". The flexible beam 36, the diaphragm 33", and a sensor vane 31" are preferably made as a single piece.

A second end of the flexible beam 36 is nonpermanently fixed to a holder 37 rigidly connected with the wall of the measuring tube. In FIGS. 9 and 10, the flexible beam 36 is bolted in place between two outwardly extending flanges 371, 372 of the holder 37.

A first piezoelectric element 34' and a second piezoelectric element 34* are bonded lengthwise to a first surface of the flexible beam 36 and a second surface opposite the first surface, respectively. In FIG. 10, instead of a sensor vane 31' as in FIG. 9, a sensor sleeve 31* is provided as in FIGS. 4 and 8.

Figure 11:
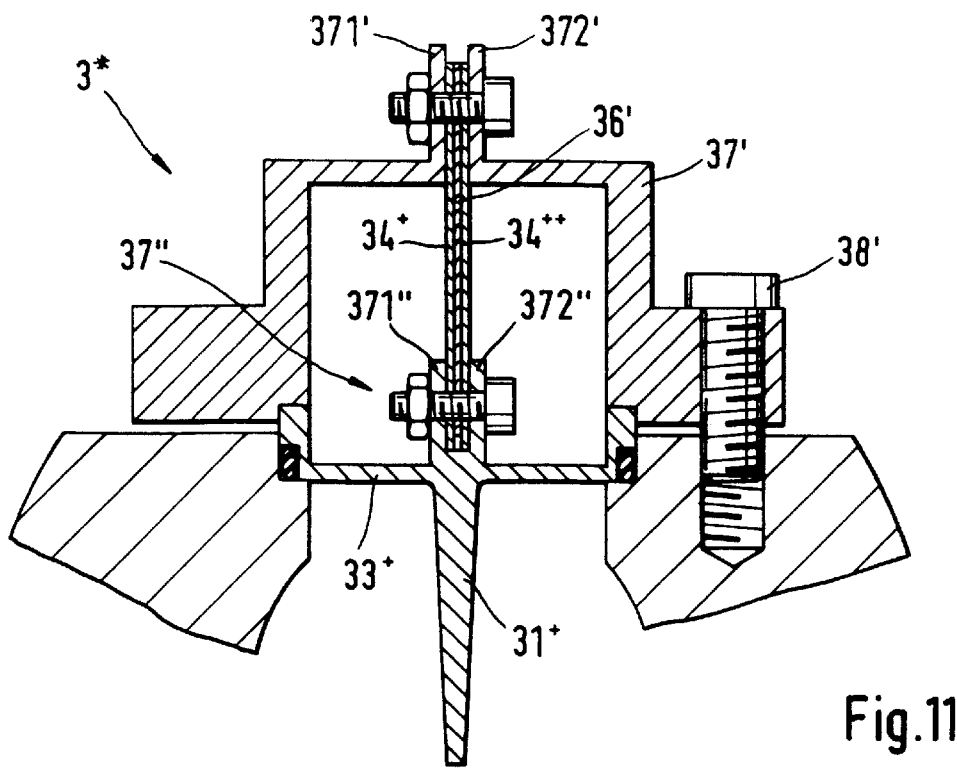
FIG. 11 is a schematic vertical section of a third embodiment of a vortex sensing element in accordance with the first variant of the invention.
Figure 12:
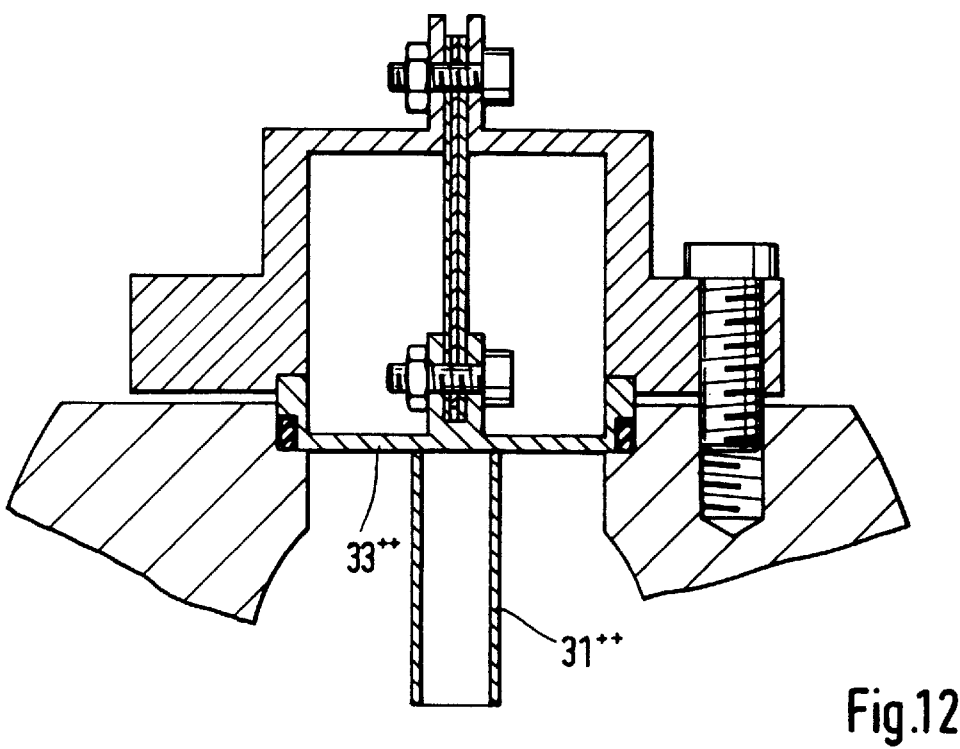
FIG. 12 is a schematic vertical section of a third embodiment of a vortex sensing element in accordance with the second variant of the invention.

FIGS. 11 and 12 show schematic vertical sections of a third embodiment of a vortex sensing element 3* in accordance with the first and second variants of the invention, respectively. A first end of a flexible beam 36' is nonpermanently fixed at the center of the second surface of a diaphragm 33*. In FIGS. 11 and 12, this end of the flexible beam 36' is bolted in place between two flanges 371", 372" formed by the diaphragm 33*.

A second end of the flexible beam 36' is nonpermanently fixed to a holder 37' rigidly connected with the wall of the measuring tube. In FIGS. 11 and 12, this second end is bolted in place between two outwardly extending flanges 371', 372' of the holder 37'.

A first piezoelectric element 34$^+$ and a second piezoelectric element 34$^{++}$ are mechanically fixed lengthwise to a first surface of the flexible beam 36' and to a second surface opposite the first surface, respectively; preferably, the two piezoelectric elements 34$^+$, 34$^{++}$ are bolted in place between the flanges 371', 372' and the flanges 371", 372" together with the flexible beam 36'. In FIG. 12, instead of a sensor vane 31$^+$ as in FIG. 11, a sensor sleeve 31$^{++}$ is provided as in FIGS. 4, 8, and 10.

What is claimed is:

1. A vortex flow sensor for measuring a flow velocity and/or a volumetric flow rate of a fluid flowing through a measuring tube, comprising:

a bluff body serving to generate Kármán vortices which is disposed along a diameter of the measuring tube and is connected with the measuring tube at least one fixing point; and a vortex sensing element responsive to vortex-induced pressure fluctuations and inserted in a wall bore of the measuring tube downstream of the bluff body, sealing off the bore toward the external surface of the measuring tube, with a center of the bore and a center of the fixing point lying on a straight surface line of the measuring tube, said vortex sensing element including a diaphragm covering the bore and having a first surface facing toward the fluid and a second surface remote from the fluid;

a rigid, thin sensor vane which is attached to the first surface of the diaphragm, is shorter than the diameter at the measuring tube, and has flat major surfaces which are in alignment with the straight surface line of the measuring tube;

and a piezoelectric element;

wherein the piezoelectric element is attached to the second surface of the diaphragm, has a base electrode on a surface facing toward the diaphragm, and has a first electrode and a second electrode on a surface remote from the diaphragm which are symmetrical with respect to a median plane of the sensor vane.

2. A vortex flow sensor as claimed in claim 1 wherein:

a first end of a flexible beam is fixed at the center of the second surface of the diaphragm, and a second end of the flexible beam is fixed to a holder rigidly connected with the wall of the measuring tube;

a first piezoelectric element is mechanically fixed lengthwise to a first surface of the flexible beam; and a second piezoelectric element is mechanically fixed lengthwise to a surface of the flexible beam opposite the first surface.

3. A vortex flow sensor as claimed in claim 1 wherein:
the diaphragm comprises a retaining ring,
  to one end of which the diaphragm is fixed, and
  which is thicker than the diaphragm;
an intermediate ring with an inside diameter, supported on
  the retaining ring and screwed to the measuring tube,
  forces the diaphragm against the external surface of the
  measuring tube, with a sealing ring interposed between
  the diaphragm and the measuring tube;
on the surface of the piezoelectric element remote from
  the diaphragm, a contact-making body having a first
  surface facing toward the piezoelectric element and a
  second surface remote from the piezoelectric element is
  provided which
  is made of insulating material, has, on the surface
    facing toward the piezoelectric element, a first contact area contacting the first electrode and a second
    contact area contacting the second electrode, and
  has, on the surface remote from the piezoelectric
    element, a third contact area electrically connected to
    the first contact area and a fourth contact area
    electrically connected to the second contact area;
a thrust ring having a diameter slightly smaller than the
  inside diameter of the intermediate ring is provided on
  the contact-making body; and
a clamping plate supported on the thrust ring and screwed
  to the intermediate ring forces the thrust ring against
  the contact-making body, the contact-making body
  against the piezoelectric element, and the piezoelectric
  element against the diaphragm.

4. A vortex flow sensor as claimed in claim 3 wherein:
the piezoelectric element and the contact-making body are
  annular, each having a central hole; and
on the surface of the diaphragm remote from the fluid, a
  compensating body extending into the central holes is
  provided,
with the areal moment of inertia of the sensor vane at the
  surface of the diaphragm facing toward the fluid being
  approximately equal to the areal moment of inertia of
  the compensating body at the surface of the diaphragm
  remote from the fluid.

5. A vortex flow sensor as claimed in claim 3, wherein:
the piezoelectric element and the contact-making body are
  annular, each having a central hole; and
on the surface of the diaphragm remote from the fluid, a
  compensating body extending into the central holes is
  provided,
with the areal moment of inertia of the sensor sleeve at the
  surface of the diaphragm facing toward the fluid being
  approximately equal to the areal moment of inertia of
  the compensating body at the surface of the diaphragm
  remote from the fluid.

6. A vortex flow sensor as claimed in claim 1 wherein:
the piezoelectric element and the contact-making body are
  annular, each having a central hole; and
on the surface of the diaphragm remote from the fluid, a
  compensating body extending into the central holes is
  provided,
with the areal moment of inertia of the sensor vane at the
  surface of the diaphragm facing toward the fluid being
  approximately equal to the areal moment of inertia of
  the compensating body at the surface of the diaphragm
  remote from the fluid.

7. A vortex flow sensor as claimed in claim 1, wherein:
the piezoelectric element and the contact-making body are
  annular, each having a central hole; and
on the surface of the diaphragm remote from the fluid, a
  compensating body extending into the central holes is
  provided,
with the areal moment of inertia of the sensor sleeve at the
  surface of the diaphragm facing toward the fluid being
  approximately equal to the areal moment of inertia of
  the compensating body at the surface of the diaphragm
  remote from the fluid.

8. A vortex flow sensor for measuring a flow velocity and/or a volumetric flow rate of a fluid flowing through a measuring tube, comprising:
a bluff body serving to generate Kármán vortices which is
  disposed along a diameter of the measuring tube and is
  connected with the measuring tube at least one fixing
  point; and
a vortex sensing element responsive to vortex-induced
  pressure fluctuations and inserted in a wall bore of the
  measuring tube downstream of the bluff body, sealing
  off the bore toward the external surface of the measuring tube, with a center of the bore and a center of the
  fixing point lying on a straight surface line of the
  measuring tube, said vortex sensing element including
a diaphragm covering the bore and having a first surface
  facing toward the fluid and a second surface remote
  from the fluid;
a rigid, thin sensor vane which is attached to the first
  surface of the diaphragm, is shorter than the diameter
  at the measuring tube, and has flat major surfaces which
  are in alignment with the straight surface line of the
  measuring tube;
and
a piezoelectric element mechanically coupled to the
  second surface of the diaphragm;
wherein
a first end of a flexible beam is fixed at the center of the
  second surface of the diaphragm, and a second end of
  the flexible beam is fixed to a holder rigidly connected
  with the wall of the measuring tube;
a first piezoelectric element is bonded lengthwise to a first
  surface of the flexible beam; and
a second piezoelectric element is bonded lengthwise to a
  surface of the flexible beam opposite the first surface.

9. A vortex flow sensor for measuring a flow velocity and/or a volumetric flow rate of a fluid flowing through a measuring tube, comprising:
a bluff body serving to generate Kármán vortices which is
  disposed along a diameter of the measuring tube and is
  connected with the measuring tube at least one fixing
  point; and
a vortex sensing element responsive to vortex-induced
  pressure fluctuations and inserted in a wall bore of the
  measuring tube downstream of the bluff body, sealing
  off the bore toward the external surface of the measuring tube, with a center of the bore and a center of the
  fixing point lying on a straight surface line of the
  measuring tube, said vortex sensing element having the
  following features:
a diaphragm covering the bore and having a first
  surface facing toward the fluid and a second surface
  remote from the fluid;
a rigid, thin sensor vane which is attached to the first
  surface of the diaphragm, is shorter than the diameter
  at the measuring tube, and has flat major surfaces
  which are in alignment with the straight surface line
  of the measuring tube;

a piezoelectric element mechanically coupled to the second surface of the diaphragm; and a contact-making body with a first surface facing toward the piezoelectric element and a second surface remote from the piezoelectric element disposed on a surface of the piezoelectric element remote from the diaphragm;

wherein the piezoelectric element and the contact-making body are annular, each having a central hole; and on a surface of the diaphragm remote from the fluid, a compensating body extending into the central holes is provided, with an areal moment of inertia of the sensor vane at the surface of the diaphragm facing toward the fluid being approximately equal to an areal moment of inertia of the compensating body at the surface of the diaphragm remote from the fluid.

10. A vortex flow sensor for measuring a flow velocity and/or a volumetric flow rate of a fluid flowing through a measuring tube, comprising:

a bluff body serving to generate Kármán vortices which is disposed along a diameter of the measuring tube, is connected with the measuring tube at least one fixing point, and has a main bore extending in the direction of said diameter and through the measuring tube as well as a secondary bore connecting the main bore with the fluid; and a vortex sensing element responsive to vortex-induced pressure fluctuations which is inserted in the main bore, sealing off the external surface of the measuring tube from the fluid, and includes a diaphragm covering the measuring-tube-side end of the main bore and having a first surface facing toward the fluid and a second surface remote from the fluid;

a rigid sensor sleeve attached to the first surface of the diaphragm;

a piezoelectric element mechanically coupled to the second surface of the diaphragm; and a contact-making body with a first surface facing toward the piezoelectric element and a second surface remote from the piezoelectric element disposed on a surface of the piezoelectric element remote from the diaphragm;

wherein the piezoelectric element and the contact-making body are annular, each having a central hole; and on a surface of the diaphragm remote from the fluid, a compensating body extending into the central holes is provided, with an areal moment of inertia of the sensor sleeve at the surface of the diaphragm facing toward the fluid being approximately equal to an areal moment of inertia of the compensating body at the surface of the diaphragm remote from the fluid.

11. A vortex flow sensor as claimed in claim 10 wherein the piezoelectric element is attached to the second surface of the diaphragm, has a base electrode on a surface facing toward the diaphragm, and has a first electrode and a second electrode on a surface remote from the diaphragm which are symmetrical with respect to a median plane of the sensor vane.

12. A vortex flow sensor for measuring a flow velocity and/or a volumetric flow rate of a fluid flowing through a measuring tube, comprising:

a bluff body serving to generate Kármán vortices which is disposed along a diameter of the measuring tube, is connected with the measuring tube at least one fixing point, and has a main bore extending in the direction of said diameter and through the measuring tube as well as a secondary bore connecting the main bore with the fluid; and a vortex sensing element responsive to vortex-induced pressure fluctuations which is inserted in the main bore, sealing off the external surface of the measuring tube from the fluid, and has the following features:

a diaphragm covering the measuring-tube-side end of the main bore and having a first surface facing toward the fluid and a second surface remote from the fluid;

a rigid sensor sleeve attached to the first surface of the diaphragm; and a piezoelectric element mechanically coupled to the second surface of the diaphragm; wherein a first end of a flexible beam is fixed a t the center of the second surface of the diaphragm, and a second end of the flexible beam is fixed to a holder rigidly connected with the wall of the measuring tube;

a first piezoelectric element is bonded lengthwise to a first surface of the flexible beam; and a second piezoelectric element is bonded lengthwise to a surface of the flexible beam opposite the first surface.

13. A vortex flow sensor for measuring a flow velocity and/or a volumetric flow rate of a fluid flowing through a measuring tube, comprising:

bluff body serving to generate Kármán vortices which is disposed along a diameter of the measuring tube, is connected with the measuring tube at at least one fixing point, and has a main bore extending in the direction of said diameter and through the measuring tube as well as a secondary bore connecting the main bore with the fluid; and a vortex sensing element responsive to vortex-induced pressure fluctuations which is inserted in the main bore, sealing off the external surface of the measuring tube from the fluid, and has the following features:

a diaphragm covering the measuring-tube-side end of the main bore and having a first surface facing toward the fluid and a second surface remote from the fluid;

a rigid sensor sleeve attached to the first surface of the diaphragm; and a piezoelectric element mechanically coupled t o the second surface of the diaphragm;

wherein a first end of a flexible beam is fixed at the center of the second surface of the diaphragm, and a second end of the flexible beam is fixed to a holder rigidly connected with the wall of the measuring tube;

a first piezoelectric element is mechanically fixed lengthwise to a first surface of the flexible beam; and a second piezoelectric element is mechanically fixed lengthwise to a surface of the flexible beam opposite the first surface.

\* \* \* \* \*

UNITED STATES PATENT AND TRADEMARK OFFICE
CERTIFICATE OF CORRECTION

PATENT NO.   : 6,352,000 B1
DATED        : March 5, 2002
INVENTOR(S)  : Igor Getman, Sergej Lopatin, Tanja Stöcklin, Frank Ohle and Roger Kerrom It is certified that error appears in the above-identified patent and that said Letters Patent is hereby corrected as shown below:

<u>Title page,</u>
Item [73], Assignee insert to read -- Endress + Hauser Flowtec AG
Reinach, Switzerland --

Signed and Sealed this

Eleventh Day of June, 2002

*Attest:*

JAMES E. ROGAN
*Attesting Officer*   *Director of the United States Patent and Trademark Office*